Figure 4:
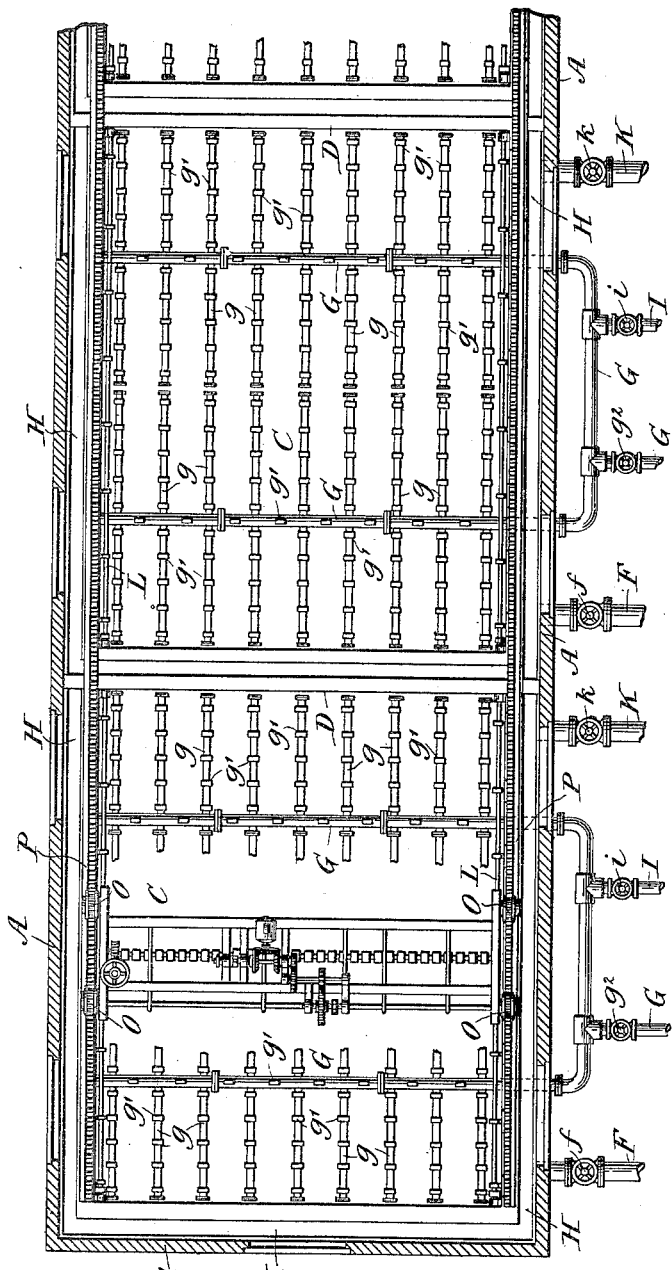

No. 668,127. Patented Feb. 12, 1901.
G. F. HODKINSON.
WATER FILTER.
(Application filed Dec. 5, 1900.)
(No Model.) 4 Sheets—Sheet 1.

Witnesses:
John A. Rennie
A. F. Sweeny.

Inventor:
George F. Hodkinson
By
Wm. H. Carleton,
his Attorney.

THE NORRIS PETERS CO., PHOTO-LITHO., WASHINGTON, D. C.

No. 668,127. Patented Feb. 12, 1901.
G. F. HODKINSON.
WATER FILTER.
(Application filed Dec. 5, 1900.)
(No Model.) 4 Sheets—Sheet 2.

Witnesses:
John A. Kenne
R. F. Sweeny

Inventor:
George F. Hodkinson
By
Wm H. Appleton,
his Attorney.

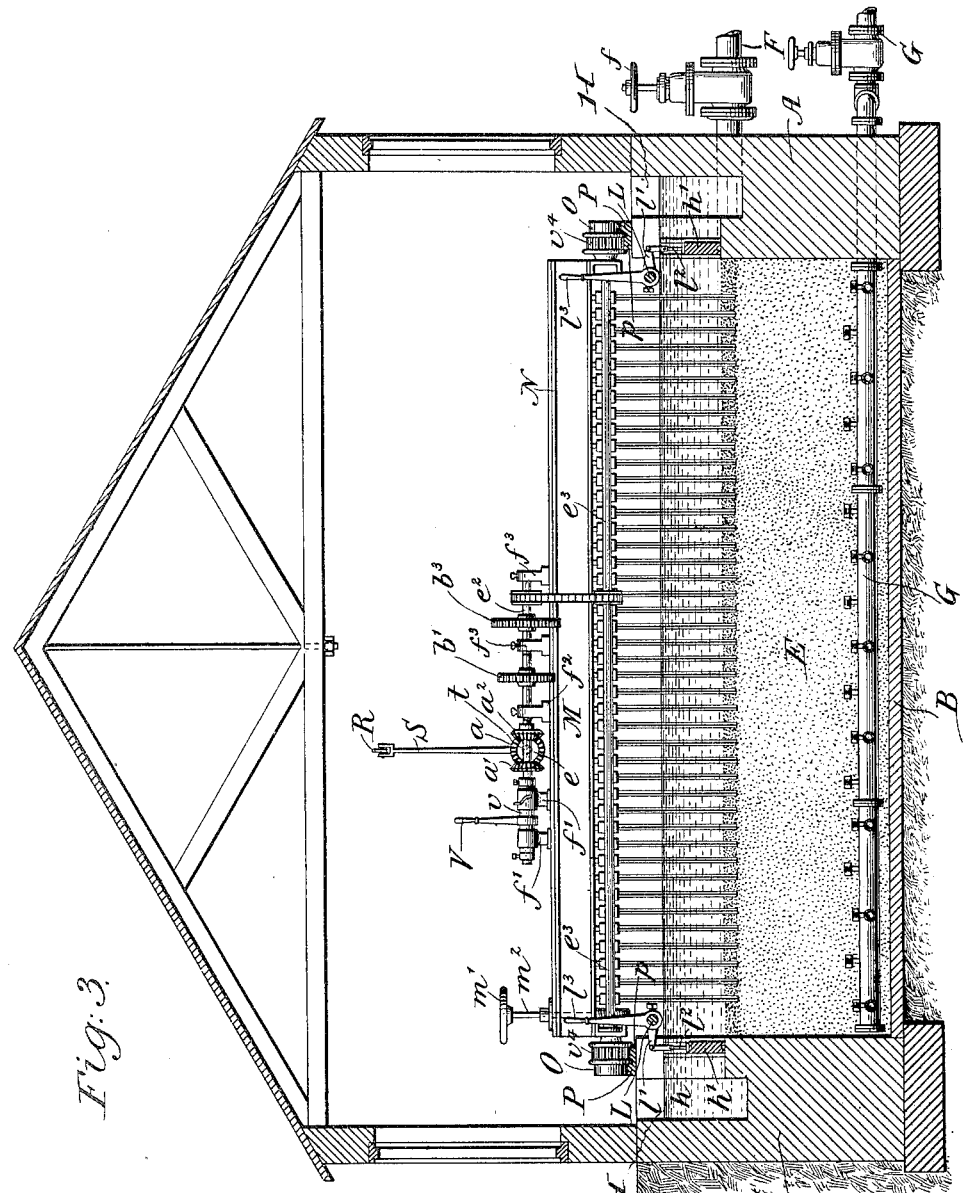

No. 668,127. Patented Feb. 12, 1901.
G. F. HODKINSON.
WATER FILTER.
(Application filed Dec. 5, 1900.)
(No Model.) 4 Sheets—Sheet 4.
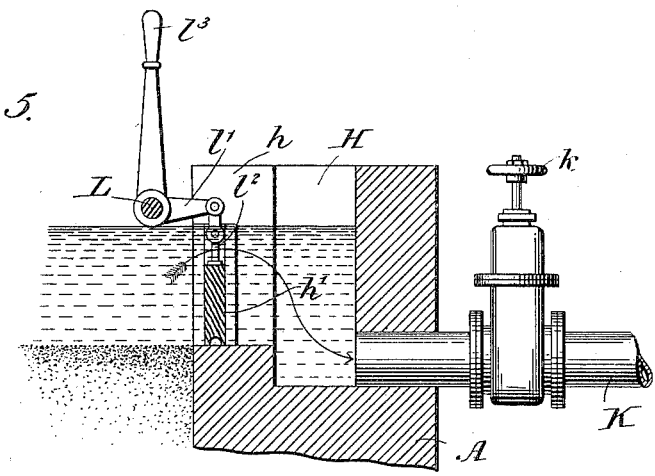
Fig: 5.
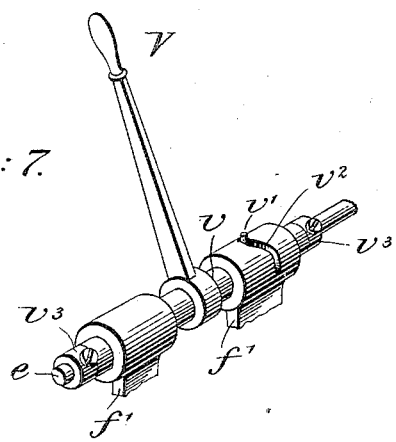
Fig: 7.
Witnesses:
John A. Rennie
R. F. Swery
Inventor:
George F. Hodkinson
By Wm. H. Appleton
his Attorney.
THE NORRIS PETERS CO., PHOTO-LITHO., WASHINGTON, D. C.

UNITED STATES PATENT OFFICE.

GEORGE F. HODKINSON, OF CHICAGO, ILLINOIS.

WATER-FILTER.

SPECIFICATION forming part of Letters Patent No. 668,127, dated February 12, 1901.

Application filed December 5, 1900. Serial No. 38,731. (No model.)

*To all whom it may concern:*

Be it known that I, GEORGE F. HODKINSON, a citizen of the United States, and a resident of Chicago, in the county of Cook and State of Illinois, have invented certain new and useful Improvements in Water-Filters, of which the following is a specification.

In the supply of water to cities and other communities for culinary and other purposes it is usually the custom to employ in connection with the system adopted a filter through which the water is passed on its way from the source of supply to the point of consumption, and this is especially the case where the water is more or less roily or carries with it other objectionable substances in mechanical suspension. These filters are of various kinds, the most common of which, however, usually consists of a suitable receptacle that is provided with a bottom and side walls of masonry or other appropriate material, with a bed of sand and gravel of gradually-increasing coarseness from top to bottom or their equivalents disposed therein. As thus constructed and arranged the water to be filtered is delivered upon the top of the bed through pipes or other conductors and passing down through the bed is discharged at its bottom, whence it passes to the storage-reservoir or other point where required. In thus passing down through this bed the water parts with the substances carried by it in suspension in consequence of their inability to pass through the interstices between the grains of the sand and gravel, and the water freed from them and filtered passes on to its destination, leaving them behind therein. As thus charged by the constant flow of the water through it the bed in time becomes choked and contaminated by these substances, which in some cases, as where excessive or tenacious, form a film or crust upon its upper surface that is wholly or partially impervious to the water, and the cleansing and washing of the bed at frequent intervals become necessary. To accomplish this, the pipes or other conductors through which the water is delivered to and conducted from the filter during the filtering operation are closed, the film or crust upon the upper surface of the filter-bed when formed broken into small pieces by hand or otherwise, and a current of water then passed in a reverse direction up through the bed by delivering it at the bottom thereof through appropriate pipes or conductors and conducting it from its top after it has traversed the mass to a sewer or other waste-weir through similar means. As a result of this operation the objectionable substances taken up by the bed during the filtering operation, along with the broken film or crust formed upon its upper surface, are thoroughly removed and carried away to the place of discharge by the reversely-moving current and such bed thereby cleansed and renovated, after which the pipes or conductors through which the reversely-moving current is delivered to and conducted from the filter are closed, the other opened, and the filtering operation resumed, and so on. While thus the washing and cleansing of the filter-bed are effected by the current of water that is passed upward through the same, it is customary in some cases to employ in connection therewith various means by which the raking over and agitation of the sand and gravel are accomplished during the time that that operation is being conducted, to the end that the objectionable substances taken up by the bed may be more efficiently liberated by the water and carried away with it.

When the amount of water to be filtered is large, as when supplied to a city or other large community, it is found more or less undesirable to employ a single large filter, because of the inconvenience experienced in thoroughly washing its entire surface and because of the fact that during such operation the entire supply of water to the city or other point of consumption is of necessity wholly suspended. To remedy this, therefore, a number of smaller filters are usually employed, which are severally provided with appropriate pipes or other conductors for conducting the water to and from them, whereby they are rendered individually capable of being brought into action to conduct the filtering operation or of being carried out of action and washed or cleansed without in any way interfering with the operation of any of the others. With each of the filters of this series a separate and distinct raking or agitating apparatus is employed, which operated from any appropriate source of power is made to traverse back and forth over the same, and thereby rake or agitate its bed when required. This arrangement, however, while efficient to a certain degree in operation, is found more or less objectionable in practice, principally because of the fact that as many agitating apparatus are required as there are filters employed, and as these either require a separate and distinct motor for each or a complicated system of shafting the cost of installation of a plant embodying them is greatly enhanced. To obviate this objection, therefore, and provide means whereby a single raking or agitating apparatus may be employed in connection with a number of filters, as well as to otherwise improve the construction of the filter and the raking or agitating apparatus themselves, are the objects of my invention.

To these ends the invention consists in certain peculiarities of construction and combinations of parts whereby the objects thus set forth are attained, the nature and distinguishing characteristics of which are hereinafter more fully explained.

Figure 1:
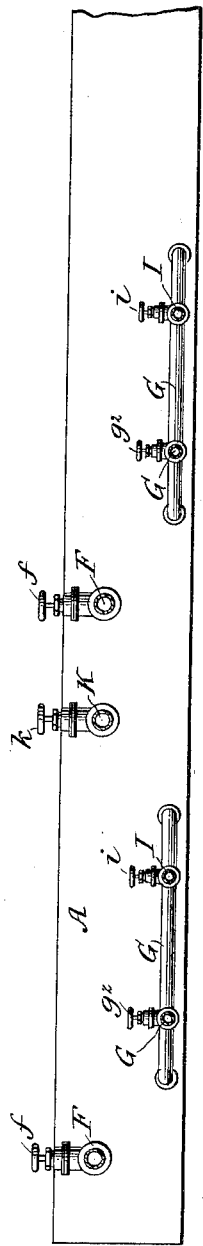
Figure 6:
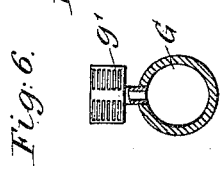
Figure 2:
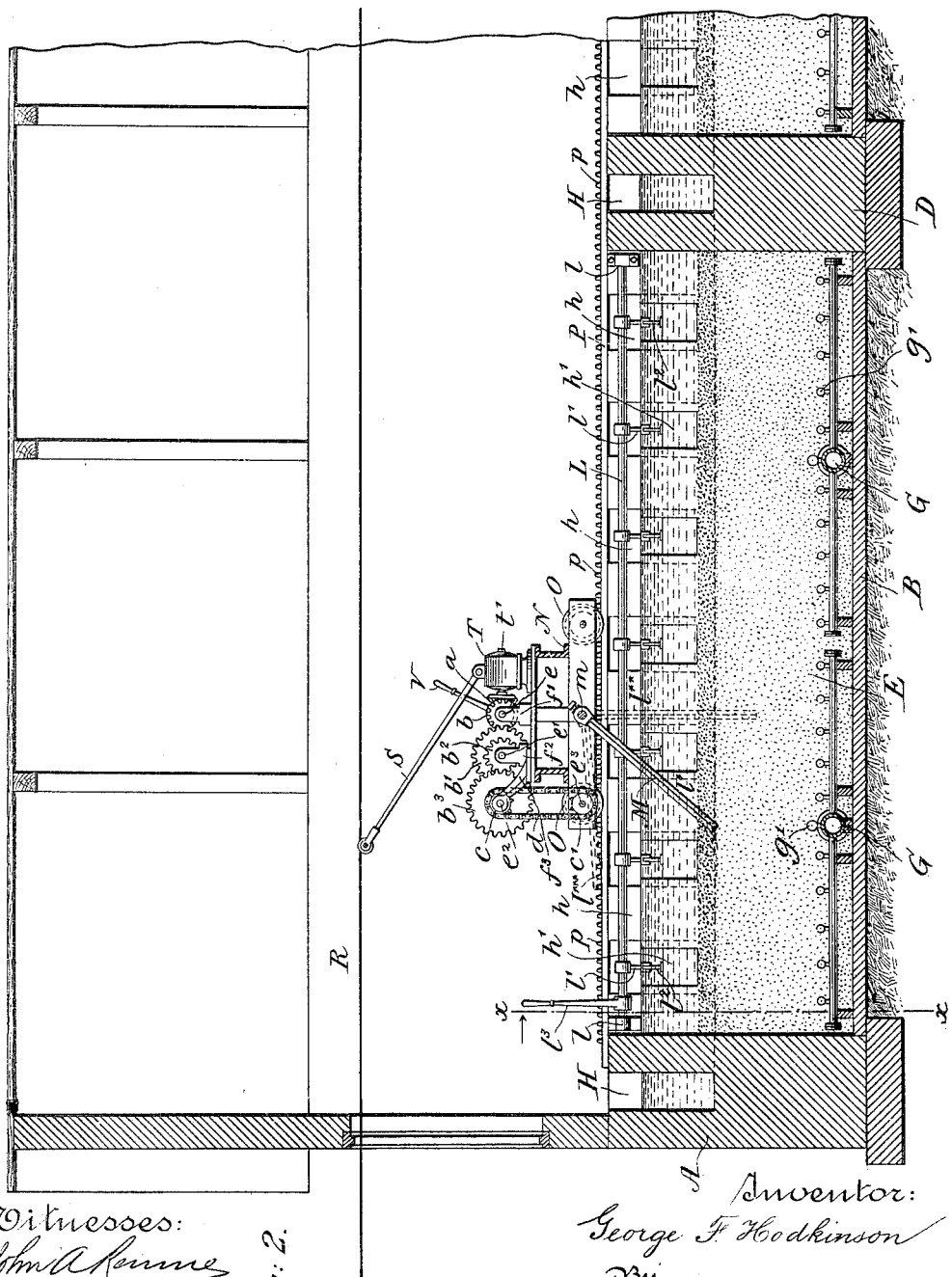

Referring to the accompanying drawings, which form a part of this specification, Figure 1 is a side elevation of a portion of a series of filters constructed in accordance with my invention and showing the arrangement of the pipes and valves for each of the constituent filters thereof; Fig. 2, a longitudinal vertical section of a portion of two filters with a raking or agitating apparatus constructed in accordance with my invention applied in connection therewith; Fig. 3, a transverse vertical sectional elevation thereof, taken in the plane $x\ x$ of Fig. 2 and looking in the direction of the arrow in that figure; Fig. 4, a plan view of the filters and raking or agitating apparatus with the filter-beds omitted from the former; Fig. 5, a detail of one of the passageways and gates and a portion of the walls of one of the filters in which they are arranged; Fig. 6, a side elevation of one of the strainers that is arranged in the bottom of the filter-beds, with the pipes in which it is secured shown in transverse section; Fig. 7, a detail showing the connection of the raking or agitating apparatus operating lever with the shaft and bearings with which it coöperates, and Fig. 8 a detail showing the means by which the rake of the raking or agitating apparatus is adjusted.

In all the figures like letters of reference are employed to designate corresponding parts.

A indicates the side walls, and B the bottom, of a series of water-filters C, which are or may be constructed of brick, stone, or other appropriate material and of any approved form. I prefer, however, to construct them in rectangular form and to arrange them in a row or, when numerous, in a number of rows that are disposed in parallel relationship to each other or one another, as the case may be. Within each of the filters C is formed a filter-bed E, which is or may be composed of sand and gravel or other appropriate granular materials that are arranged therein in the order of their fineness, with the largest or coarsest of their grains at the bottom and the progressively smaller or finer grains above in regular order to the top, where the finest grains are disposed. As thus constructed the water to be filtered is delivered upon the top of this filter-bed and after having traversed the same is discharged from the bottom thereof. To permit of this being accomplished, I provide each of the filters near its top with a pipe F, which is connected with the source of the water-supply, and also near its bottom with a second pipe G, that is connected with the pipe or main leading to the point of consumption. Instead, however, of delivering the water directly from the pipes F upon the top of the filter-bed I preferably make use of a gutter H, into which it is discharged and from which it is delivered upon the top of the filter-bed. This gutter is conveniently formed in the upper edge of the filter-walls and preferably extends around three sides of the filter, with the inner wall rising some distance above the top of the filter-bed, whereby the water accumulating therein from the pipe F is delivered upon the upper surface of the filter-bed, along the front and back thereof, and the disarrangement of the upper surface thereof, due to the erosion incident to its rapid discharge at one point, thereby obviated. The pipe G, either as a whole or in divisions, on the other hand, extends inward across the bottom of each of the filter-beds and is provided at suitable points along the same with laterally - extending branches $g$, which, with the main pipe, are provided at the proper distances apart along their upper surfaces with strainers $g'$. The various filters C being thus constructed and equipped severally serve by themselves, independently of the others, to receive the water from the source of supply and after filtering it deliver it to the point of consumption, which operations when initiated may be continued until some or all of their respective beds have become so contaminated and clogged by the impurities separated out from the water and taken up by them in the filtering operation that the passage of the water through such beds is so retarded that the washing and cleansing of the latter become necessary. In order, therefore, to accomplish this, each of the filters C is provided near its bottom with a pipe I, which is connected with the source of water-supply, and also near its upper edge with a pipe K, which is connected with the gutter H and extends to a sewer or other waste-weir. By this means the washing of the filter-bed by the passing of a current of water upward through the same and thence to the sewer or other discharging-point is effected, and in order to permit of this being accomplished the supply-pipe F and discharge-pipe G are respectively provided with valves $f$ and $g^2$, which are first closed and the valves $i$ and $k$, with which the pipes I and K are respectively provided, then opened, when the water will enter at the bottom of the bed and passing up through the same cleanse and wash out all the impurities taken up by it, carrying them over into the gutter H and thence to the sewer or other point of discharge through the pipe K.

In those cases where from the excessive quantity or tenacious character of the impurities removed a film or crust has been formed upon the top of the filter-bed the breaking up and floating away of the same before the washing operation is commenced in some instances become necessary. To this end the inner walls of the gutter H at the front and back of each of the filters are provided with a number of passage-ways $h$, which extend therethrough, with their bottom edges approximately in line with the upper surface of the filter-bed, and are severally equipped with gates $h'$, which, fitted to open and close the lower portions thereof, are constructed of a height somewhat less than that of the passage-ways in which they are respectively disposed. In their normal condition, as when the filtering operation is in progress, the lower portions of these passage-ways are closed by the gates $h'$, and the water supplied by the pipe F to the gutter H in reaching the filter-bed flows over the tops of such gates. On the other hand, when the film or crust is to be carried away the lower portions of these passage-ways, after it has been broken, are opened and the broken portions thereof floated out through the same into the gutter H, whence they pass to the pipe K and thence are discharged therethrough or otherwise removed. The disposition of this film or crust having been effected, the washing of the filter-bed by passing a current of water in a reverse direction up through the same may then be accomplished, prior to which, however, the lower portions of the passage-ways $h$ must be closed by the gates $h'$ in order that the water in thus passing up through the filter-bed on its way to the gutter H may be caused to rise to some considerable height above the upper surface of the bed and then flow over the tops of the gates, as shown by the course of the arrow in Fig. 5, whereby to obviate the danger of carrying away portions of the sand or other components of such bed with it that would be present if its flow to the gutter were beneath them. For operating these gates whereby to open and close the lower portions of the passage-ways $h$ as required various means may be adopted. I prefer, however, to employ the shafts L for the purpose, with one of which the front and back of each of the filters are respectively provided, and to accomplish the opening and closing of the lower portions of the passage-ways by raising and lowering the gates therein. To this end the shafts are severally mounted in suitable hangers $l$, that are secured to the walls or other convenient parts of their respective filters, with each of said shafts provided with laterally-extending arms $l'$, that are connected at their free ends with their respective gates through appropriate connecting-rods $l^2$, as shown. By this arrangement, as will be seen, the operation of all of the gates on either the front or back of any one of the filters may be effected in unison by simply oscillating their respective shafts L in the appropriate direction, which may be accomplished by a lever $l^3$, with which each of these shafts may be provided.

With a view to the breaking up of the film or crust when one is formed and the loosening up and agitation of the components of the filter-bed during the washing operation I make use of a rake M, which is preferably supported and carried by a carriage N, that is capable of a traveling movement back and forth over the row or series of filters, whereby to permit of the use of a single rake and carriage therewith. To this end I provide the carriage with appropriate wheels O, which are adapted to run upon suitable rails P, that are supported upon the upper edge of the walls and extend from one end of the row of filters to the other, with one of these rails disposed near one side of the series and the other rail near the opposite side thereof. As thus supported the carriage, with its rake, extends over the filters from near one of their walls to near their opposite walls and may be moved over any one of the series and there operated by any appropriate power. In my improved form of construction, however, I avail of an electric current for the purpose, which is or may be supplied, through a suitable conductor R and trolley-arm S, from any convenient source of electric supply to a motor T, that is mounted upon the carriage N and connected to one of the pairs of wheels O thereof by any appropriate means. The means whereby this connection is made selected by me for the purpose of illustration, however, consists of the bevel-gears $a$, $a'$, and $a^2$, the spur-gears $b$, $b'$, $b^2$, and $b^3$, the sprocket-wheels $c$ and $c'$, and the sprocket-chain $d$. Of these the bevel-gear $a$ is secured to the shaft $t$ of the armature $t'$ and meshes with one or the other of the bevel-gears $a'$ and $a^2$, which with the spur-gear $b$ are fixedly secured to the shaft $e$, that is mounted in suitable hangers $f'$, secured to the carriage N. The spur-gears $b'$, $b^2$, and $b^3$, on the other hand, are respectively secured to the shafts $e'$ and $e^2$, that are in like manner supported from the carriage N by the respective hangers $f^2$ and $f^3$, while the sprocket-wheels $c$ and $c'$ are respectively secured upon the shafts $e^2$ and $e^3$ and are connected by the endless sprocket-chain $d$. As thus connected and arranged the movement of the carriage, with its attached rake, back and forth over the filters C may be effected by bringing one and then the other of the gears $a'$ and $a^2$ into engagement with the gear $a$ in the required order, which may be accomplished by sliding their carrying-shaft $e$ longitudinally in its supporting-hangers $f'$ through the instrumentality of a lever V or otherwise. The connection of this lever with the shaft $e$ when employed may be effected in various ways. As shown in the drawings, however, it consists of a sleeve $v$, which, surrounding a portion of the shaft and mounted in the hangers $f'$, is provided with an outwardly-projecting pin $v'$, which engages with a spiral slot $v^2$, formed in one of such hangers, as shown more fully in Fig. 7. With the lever connected with the shaft as thus described the longitudinal movement of the latter may be effected by simply oscillating the sleeve $v$ in the required direction by the lever or otherwise, when, through its pin-and-slot connection with the hanger $f'$, a longitudinal movement will be imparted thereto, which in turn will be communicated to the shaft $e$ through the intervention of one or the other of the collars $v^3$, with which it is provided. While the movements of the carriage N back and forth over the series of filters C are thus controlled, its positive movement along the tracks P are insured by the gears $v^4$, which are secured to the shaft $e^3$ at the proper distance apart and engage with the racks $p$, that are preferably supported upon the top of the walls beside the tracks and extend throughout the length of the series of filters over which the carriage travels. When the breaking up of the film or crust on the filter-bed is required, the rake M will be so adjusted that its teeth will trail upon the surface of the filter-bed and not penetrate the same but to a slight extent, and it will then occupy the position shown at $l^*$ in Fig. 2. On the other hand, when the washing of the filter-bed is being effected and the components thereof are being harrowed or agitated it will occupy the position shown at $l^{}$ in that figure, while in passing with the carriage N from one filter to another over the intervening walls it will occupy the position shown at $l^{*}$ therein. In order, therefore, to permit of its assuming and being positively held in those various positions, the rake instead of being fixedly secured to the carriage N is pivotally supported by a shaft $m$ and is adjustable with respect thereto by a hand-wheel $m'$ through the intermediaries of a shaft $m^2$, a worm $m^3$ thereon, and a worm-gear $m^4$ on the shaft $m$, with which such worm engages.

With the parts constructed and arranged as above described and with the gates $h'$ closed and the valves $f$ and $g^2$ opened the water from the source of supply will flow through the pipe F into the gutter H, thence over the tops of the gates $h'$ to the filter-bed, thence down through the same to the strainers $g'$, and be filtered thereby, and thence to the point of consumption through the pipe G. The operation thus indicated will continue until the filter-bed becomes clogged or otherwise contaminated by the objectionable matter taken up therein, when the washing of the same will become necessary. To effect this, the valves $f$ and $g^2$ will be closed, the valve $k$ opened, and the rake M brought over the particular filter to be washed and agitated and adjusted into the position shown at $l^*$ in Fig. 2, in which it will be trailed over the filter-bed, breaking the film or crust thereon, which will then be floated out through the passageways $h$, beneath the gates $h'$, that have previously been raised, and thence to the waste-weir or other point of discharge. The removal of the film or crust having been thus accomplished, the gates $h'$ are then closed, the rake M adjusted into the position shown at $l^{}$ in that figure, the valve $i$ opened, and the rake traversed back and forth over the filter-bed, raking and agitating it as the water in passing up through it from the pipe I washes and cleanses the same on its way over the gates and along the gutter H to the waste-weir or other point of discharge through the pipe K. The washing and treating of the filter-bed thus described having been completed, the valves $i$ and $k$ will be closed, the rake M adjusted into the position shown at $l^{*}$ in Fig. 2, and the valves $f$ and $g^2$ opened, when the filtering of the water will be again resumed and the rake M and carriage N moved to the next filter C, where required, and so on.

It will thus be seen from the foregoing that I not only produce an efficient and greatly-improved filter, but provide means whereby a single rake or agitator and its supporting-carriage may be employed in connection with a series of such filters.

While in the foregoing I have described a traveling rake or agitating device that is adapted to be used in connection with a series of filters and be transferred from one of these filters to the other to be used in its bed, I make no claims, broadly, herein to a device of this character when it is mounted to travel upon tracks or ways from one filter-bed to the other and is provided with teeth or arms that are designed to depend into the bed to agitate the same, with said parts so constructed as to permit of the teeth or arms being brought above the level of the walls of the filters containing the beds, whereby said agitator may be transferred from one filter to the other or to a rake or agitator for filter-beds when comprising a support, a longitudinal series of pendulous stirrer teeth or arms connected thereto and constructed to swing rearwardly, with means for locking said teeth or arms rigidly with respect to the support and from both forward and rearward movements, as these form the subject of an application for Letters Patent filed by me in United States Patent Office May 1, 1900, Serial No. 16,247; but, Having described my invention and specified certain of the ways in which it is or may be carried into effect, I claim and desire to secure by Letters Patent of the United States—

1. The combination, with the side walls of a water-filter, and the filter-bed thereof, of a gutter arranged along the edges of such filter-bed, with its walls extending above the upper surfaces of the same and provided with passage-ways therethrough, a conductor for connecting this gutter with the source of the water-supply, a conductor leading from such gutter to the place of waste, and gates for closing and opening the lower portions of said passage-ways made of a height somewhat less than that of the passage-ways, whereby the water in being filtered is delivered to the gutter and thence to the upper surfaces of the filter-bed over the tops of such gates, while the film or crust formed on the top of such bed, when broken, is removed beneath said gates, and thence passed to the place of discharge through the gutter and discharging-conductor, substantially as described.

2. The combination, with the side walls of a water-filter, a filter-bed, and a gutter formed in the upper portion of such walls along the sides of the filter-bed and provided with passage-ways through its inner walls, of conductors for respectively connecting this gutter with the source of the water-supply, and with the place of waste, conductors extending into the lower portion of the filter-bed and, in like manner, respectively connected with the source of the water-supply and with the point of consumption, valves in these several conductors, and gates for the said passage-ways, whereby the water may be either passed into the gutter and thence upon the top of and down through the filter-bed, over the tops of such gates, to the point of consumption, or beneath and up through such bed to the sewer or waste-weir, over said gates and along the gutter and discharge-conductor as desired, by properly adjusting said valves, substantially as described.

3. The combination, with the walls of a water-filter, a gutter arranged in connection therewith and provided with passage-ways through its inner walls, and gates for closing and opening the lower portions of such passage-ways made of a height somewhat less than that of the passage-ways, of a shaft provided with a laterally-projecting arm for each of those gates, rods for connecting the free ends of these arms with their respective gates, and means by which said shaft may be rotated, whereby the opening and closing of such gates may be effected by rotating such shaft in one and the other direction by its operating devices, substantially as described.

4. The combination, with the walls of a water-filter, a gutter arranged in connection with them and provided with passage-ways through its inner walls, gates for closing and opening the lower portions of such passage-ways made of a height somewhat less than that of the passage-ways, means whereby these gates may be raised and lowered, and tracks, one of which is arranged near one side of the filter and the other near the opposite side thereof, of a device for agitating and loosening up the material composing the filter-bed, a carriage by which this agitating device is supported and carried on said tracks, and a motor for propelling this carriage back and forth along the same, whereby the flow of the water to and from the filters may be controlled and the agitating device moved back and forth over the filter-bed to agitate and loosen up the material of the same, substantially as described.

5. The combination, with a series of water-filters having side walls that extend from one end of the series to the other, gutters arranged in connection with such filters and provided with passage-ways in their inner walls, gates for closing and opening the lower portions of such passage-ways made of a height somewhat less than that of the passage-ways, means for raising and lowering these gates, and tracks extending throughout the length of the series with one of these tracks arranged near one side of said series and the other near the opposite side thereof, of a device for agitating and loosening up, the material composing the filter-bed, a carriage by which this agitating device is supported and carried on said tracks, and a motor for propelling this carriage back and forth along the tracks, whereby the flow of the water to and from the several filters may be regulated and the agitating device moved to any one of the filters of the series and there operated to agitate the material of the filter-bed, substantially as described.

In witness whereof I have hereunto set my hand this 28th day of November, 1900.

GEORGE F. HODKINSON.

Witnesses:
IRVING H. PETERSON,
WILLIAM O'LEARY.